(No Model.) 3 Sheets—Sheet 1.
A. M. SMITH.
COMBINED HARVESTER AND THRESHER.
No. 575,134. Patented Jan. 12, 1897.
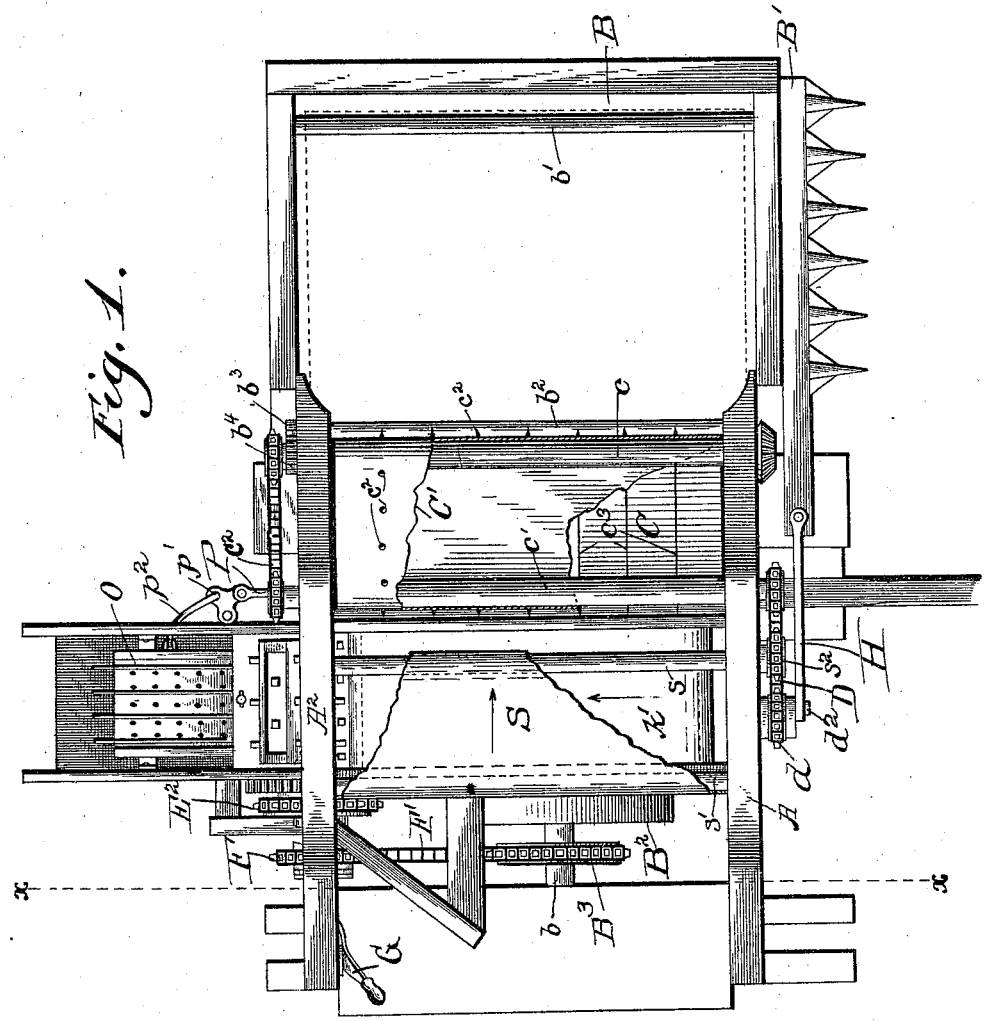
Witnesses:
J. B. McGirr.
Jos. H. Milans.
Inventor:
Adolphus M. Smith,
By L. S. Bacon
Atty.

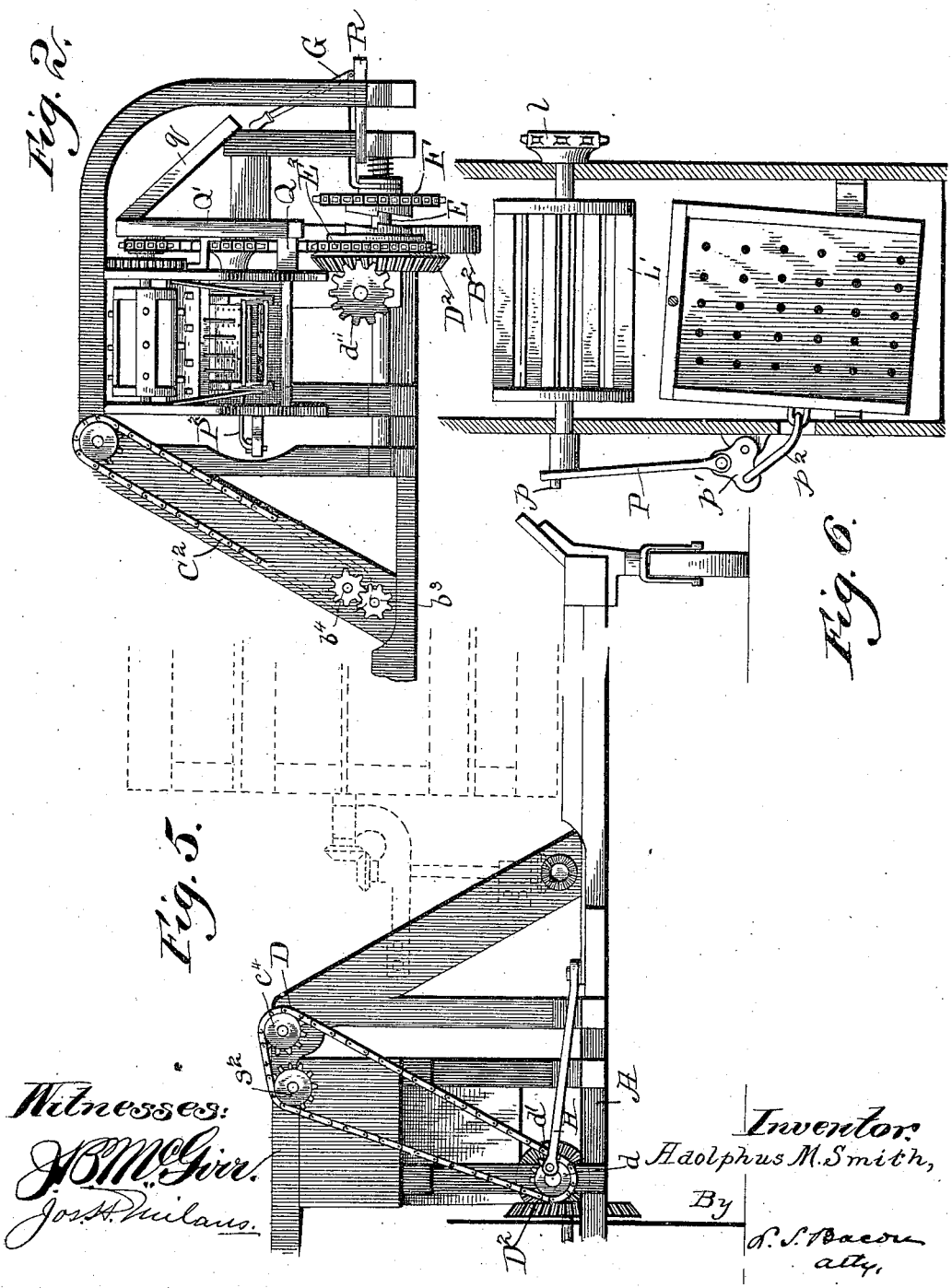

(No Model.) 3 Sheets—Sheet 3.
A. M. SMITH.
COMBINED HARVESTER AND THRESHER.
No. 575,134. Patented Jan. 12, 1897.
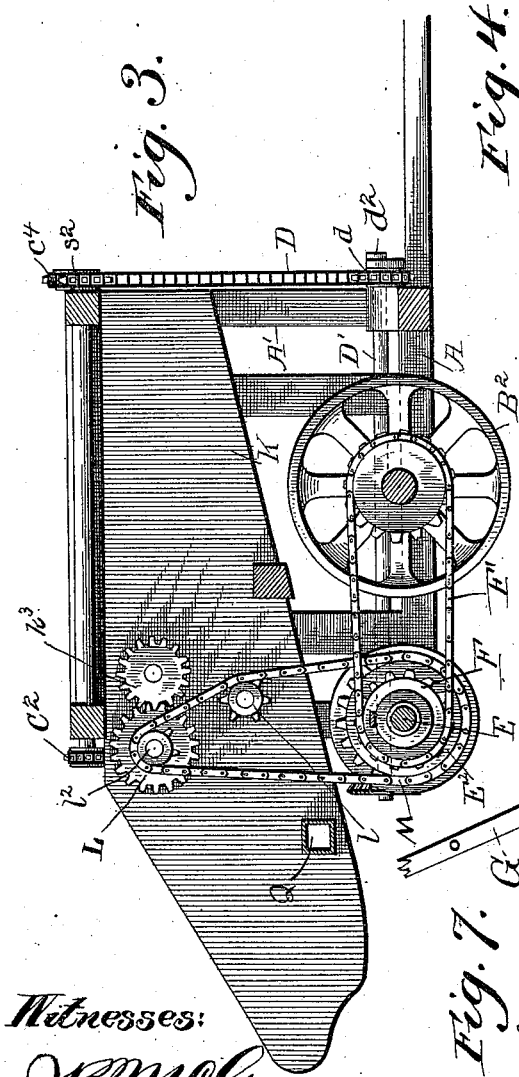
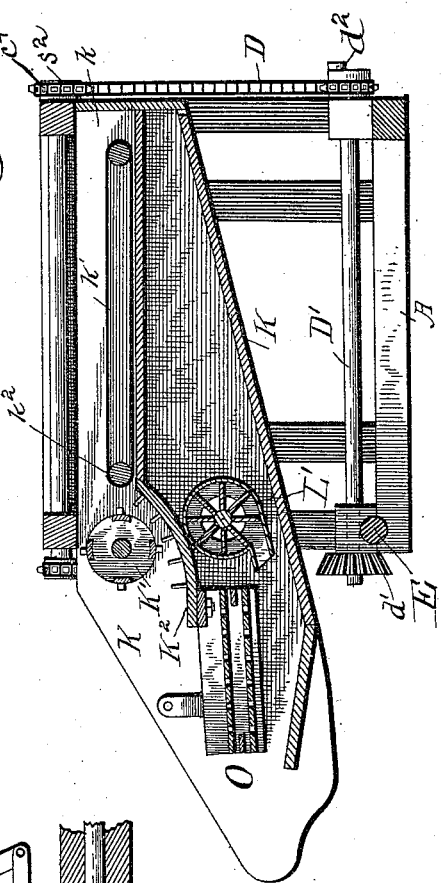
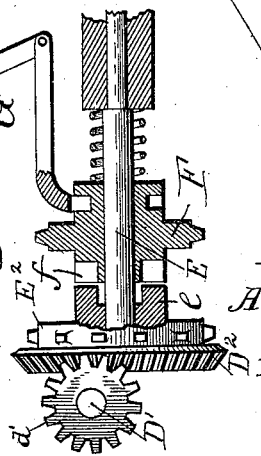
Witnesses:
J. B. McGirr.
Jos. H. Milans
Inventor:
Adolphus M. Smith,
By
T. J. Bacon
atty.

UNITED STATES PATENT OFFICE.

ADOLPHUS M. SMITH, OF MYERSVILLE, MARYLAND.

COMBINED HARVESTER AND THRESHER.

SPECIFICATION forming part of Letters Patent No. 575,134, dated January 12, 1897.

Application filed March 18, 1896. Serial No. 583,803. (No model.)

*To all whom it may concern:*

Be it known that I, ADOLPHUS M. SMITH, a citizen of the United States, residing at Myersville, in the county of Frederick and State of Maryland, have invented certain new and useful Improvements in a Combined Harvester and Thresher; and I do hereby declare the following to be a full, clear, and exact description of the invention, such as will enable others skilled in the art to which it appertains to make and use the same.

This invention relates to improvements in combined reapers and threshers, and more particularly to that class of inventions wherein the grain is cut and it, together with the stalk or straw, is delivered into a separator and the grain separated and delivered to a suitable point for bagging, while the straw is discharged to any desirable or convenient point.

Heretofore it has been suggested to combine a thresher or separator with a reaping-machine, but more generally such suggestions have been directed to the reaping or gathering of the heads only; and, further, machines of this general class which have heretofore been suggested are in their structure complicated and very heavy.

The aim and purpose of my invention are to provide a light and practicable machine wherein is embodied structural simplicity, and, further, to provide a machine which will be susceptible of use on the average farm and which will require an usual amount of power to drive or operate.

In the accompanying drawings, Figure 1 represents a plan view of the machine, showing parts omitted and a portion of certain aprons broken away. Fig. 2 is a rear view showing the platform broken away. Fig. 3 is a side elevation with the near portion of the frame omitted and portions in section. Fig. 4 is a longitudinal section through the separator. Fig. 5 is a front elevation of a portion of the machine. Fig. 6 is a detail sectional plan of a portion of the separator, and Fig. 7 is a detail section of the clutch mechanism.

In the drawings, A designates the base, A' the front, and $A^2$ the rear upright framework.

B designates the platform, B' the cutter-bar, and $B^2$ the ground-wheel, which latter is mounted on a suitable axle $b$, on which is a driving-sprocket $B^3$.

On the platform, at opposite ends, are mounted the belt-rollers $b'$ $b^2$, over which a conveyer-belt passes, as shown in dotted lines, Fig. 1. The outer roll is an idle-roll, while the inner roll $b^2$ has a pinion $b^3$ on one end, as shown in Figs. 1 and 2. With the pinion $b^3$ meshes a pinion $b^4$ on a roll $c$, mounted at the lower end of the inclined conveyer-section C, while at the upper end of the section C is a driving-roll $c'$, the same being geared with the roll $c$ through the instrumentality of a sprocket-chain $c^3$, passing over sprocket-wheels on the rollers $c$ $c'$, as shown in Figs. 1 and 2. Over the rollers $c$ $c'$ passes the belt C', having the teeth $c^2$, which, in passing over the face of the section C, enter the grooves $c^3$. This belt is geared, as will presently be seen, to travel with its outer face descending.

To drive the belt C', a sprocket-wheel $c^4$ is secured on its forward end, over which passes a sprocket-chain D, extending down to a sprocket $d$ on a longitudinal shaft D', mounted in the lower part of the machine. This shaft D' has a beveled pinion $d'$ on its rear end, which meshes with a beveled pinion $D^2$, mounted on a transverse shaft E, journaled in bearings in the frame.

On the shaft E is a fixed sprocket $E^2$, having a hub $e$, formed with a clutch-face, with which a corresponding face $f$ on a loose sprocket-wheel F engages. The loose sprocket is shifted on the shaft E by the lever G, extending to any convenient part of the machine.

A sprocket-chain F' connects the wheel B with the wheel F, by which the entire mechanism is driven.

On the forward end of the shaft D' is a crank $d^2$, to which the pitman H is secured, the opposite end of the pitman being secured to the cutter-bar.

Mounted in the upper part of the framework is the casing K, extending from front to rear, a delivery-trough $k$ being formed in its upper forward portion. In this trough $k$ is the conveyer-belt $k'$, which passes over rolls at the opposite ends of the trough, the roller $k^2$ having a pinion $k^3$ on its end outside the casing.

In the rear of the trough $k$ is the cylinder and concave K' K² of any desired form, the former having on its shaft a gear L outside the casing, which meshes with the pinion $k^3$. Below the concave is a suitable fan L', mounted on a shaft which carries a sprocket $l$ on its outer end.

M is a sprocket-chain passing over the sprocket-wheel E², up over a sprocket $l^2$ on the cylinder-shaft, and forward over the front edge of sprocket $l$.

O designates the shoe or screen, pivoted in the casing in any convenient manner. This may be of any desirable form and is actuated, preferably, by a crank $p$ on the fan-shaft, to which is connected the pitman P, which in turn is connected to a bell-crank $p'$, pivoted in any convenient manner to the casing. The shoe is connected to the bell-crank by a link $p^2$. By this means a lateral shake is imparted to the shoe.

At the lower end of the casing is a discharge-spout Q, which leads to an elevator-trough Q', the bucket-belt of which (not shown) may conveniently be drawn from the cylinder-shaft, as indicated in Fig. 2.

A filling-spout $q$ receives the grain from the elevator, the same terminating adjacent to a bagging-platform R at the side of the machine.

As the grain is elevated to the trough $k$ it is met by a belt S, which extends partly over the trough and travels in the direction of the arrow, Fig. 1. This belt passes over rollers $s\ s,'$ the former having a sprocket $s^2$ on its forward end, over which the chain D passes, as seen in Fig. 2. By this means the grain is positively directed onto the belt $k'$.

In operation as the grain is delivered onto the platform-belt it is moved to the oblique belt, the teeth of which catch the straw, carrying it up between the back and belt. It is then discharged into the trough $k$ and is prevented from overriding or going beyond the trough by the apron or belt S. As the grain is discharged into the trough it is immediately carried to the rear and delivered to the cylinder. From the cylinder the material is directed onto the shoe, the straw forced out in the rear of the machine, while the grain by the means described is carried to the bagging point or platform.

While I have illustrated the features of the machine so that an intelligent appreciation of the invention can be had, enabling one skilled in the art to make and use the same, yet the particular construction of the various members of parts are obviously susceptible of various alterations or changes, as occasion or experience may dictate. These changes may be made without departing from the nature and principle of my invention.

Having thus described my invention, what is claimed as new, and desired to be secured by Letters Patent, is—

1. In a combined harvester and thresher, the combination with the associated parts of the harvester, and a threshing attachment, of conveying means interposed between the harvester and thresher comprising a conveyer-belt, a trough into which the same discharges, an apron at the end of the conveyer opposite the discharge-passage therefor, and means for driving the apron in a direction opposite that of the conveyer.

2. In a combined harvester and thresher, the combination with the frame and cutting mechanism, of a horizontal platform, a traveling apron thereon, an inclined conveyer, a trough at the upper end of the conveyer, an apron projecting over the trough and located adjacent to the upper end of the inclined conveyer and arranged to travel in a direction opposite that of the inclined conveyer, a longitudinally-traveling apron in the bottom of the trough, and separating means at the rear of the trough, substantially as described.

In testimony whereof I affix my signature in presence of two witnesses.

ADOLPHUS M. SMITH.

Witnesses:
A. SIDNEY SMITH,
ESTEN A. SMITH.